(12) United States Patent
Angus et al.

(10) Patent No.: US 8,573,061 B2
(45) Date of Patent: Nov. 5, 2013

(54) PRESSURE INDICATOR

(75) Inventors: Douglas J. Angus, Elgin (GB); Alexander E. H. Fitzhugh, Bristol (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 13/225,983

(22) Filed: Sep. 6, 2011

(65) Prior Publication Data

US 2012/0090531 A1 Apr. 19, 2012

(30) Foreign Application Priority Data

Oct. 14, 2010 (GB) .................................. 1017353.2
Oct. 25, 2010 (GB) .................................. 1017959.6

(51) Int. Cl.
*G01L 7/00* (2006.01)
*G01L 11/00* (2006.01)

(52) U.S. Cl.
USPC ............................................. 73/706; 73/702

(58) Field of Classification Search
USPC .................................................. 73/700–756
See application file for complete search history.

(56) References Cited

U.S. PATENT DOCUMENTS

| | | | |
|---|---|---|---|
| 1,619,444 A | 3/1927 | Taylor | |
| 2,486,133 A | 10/1949 | Egger | |
| 2,804,093 A | 8/1957 | Scherer | |
| 3,224,020 A | 12/1965 | Ryutaro Mori et al. | |
| 4,299,253 A | 11/1981 | Burton | |
| 4,413,524 A | 11/1983 | Kosh | |
| 4,517,844 A * | 5/1985 | Powell | ............................ 73/707 |
| 4,668,889 A | 5/1987 | Adams | |
| 5,343,754 A | 9/1994 | Stone | |
| 5,509,312 A | 4/1996 | Donzier et al. | |
| 2003/0131666 A1 | 7/2003 | Ewers et al. | |
| 2005/0115326 A1* | 6/2005 | Dannhauer et al. | ............. 73/716 |
| 2006/0156824 A1 | 7/2006 | Grudzien | |
| 2007/0120568 A1 | 5/2007 | Bjorkman et al. | |
| 2010/0018319 A1 | 1/2010 | Kurtz et al. | |
| 2010/0024562 A1* | 2/2010 | Kurth et al. | ..................... 73/702 |
| 2010/0064815 A1* | 3/2010 | Vogler | ............................. 73/706 |
| 2010/0175482 A1 | 7/2010 | Kurtz et al. | |
| 2011/0185818 A1* | 8/2011 | Kurtz et al. | ..................... 73/721 |
| 2012/0090397 A1* | 4/2012 | Angus et al. | .................... 73/700 |

FOREIGN PATENT DOCUMENTS

| | | |
|---|---|---|
| EP | 0 334 235 A1 | 9/1989 |
| EP | 0 350 612 A2 | 1/1990 |
| EP | 1 555 518 A1 | 7/2005 |
| GB | 570927 | 7/1945 |
| GB | 963607 | 7/1964 |

(Continued)

OTHER PUBLICATIONS

British Search Report issued in British Patent Application No. 1113348.5 dated Nov. 23, 2011.

(Continued)

*Primary Examiner* — Andre Allen
(74) *Attorney, Agent, or Firm* — Oliff & Berridge, PLC

(57) ABSTRACT

A pressure indicator for indicating pressure of a pressure source. The indicator comprises a first reservoir which defines a first enclosed volume having a first inlet pipe for communication between the first enclosed volume and a first source of pressurised fluid. A damping passage is provided in fluid communication with the first enclosed volume. A pressure oscillation damping means is provided in the damping passage. The damping means comprises a moveable body constrained within a limited range of motion along the damping passage.

20 Claims, 4 Drawing Sheets

(56) References Cited

FOREIGN PATENT DOCUMENTS

| GB | 2 456 865 A | 7/2009 |
|---|---|---|
| JP | A-61-167832 | 7/1986 |
| JP | A-10-54326 | 2/1998 |
| JP | A-2005-257551 | 9/2005 |
| SU | 621981 | 8/1978 |
| WO | WO 2006/076745 A1 | 7/2006 |
| WO | WO 2009/077433 A1 | 6/2009 |

OTHER PUBLICATIONS

Partial European Search Report issued in European Application No. 11 18 0144 on Nov. 21, 2011.
European Search Report issued in European Application No. 11 18 0143 on Nov. 21, 2011.
European Search Report issued in European Application No. 11 18 0140 on Nov. 21, 2011.
British Search Report issued in British Application No. GB1115279.0 on Jan. 5, 2012.
Search Report issued in British Application No. GB1017959.6 dated Feb. 25, 2011.
Search Report issued in British Application No. GB1017351.6 dated Mar. 31, 2011.
Search Report issued in British Application No. GB1017355.7 dated Apr. 1, 2011.
U.S. Appl. No. 13/225,768, filed Sep. 6, 2011 in the name of Douglas J. Angus et al.
U.S. Appl. No. 13/226,023, filed Sep. 6, 2011 in the name of Douglas J. Angus et al.
Jun. 6, 2013 Office Action issued in U.S. Appl. No. 13/226,023.

* cited by examiner

PRESSURE INDICATOR

The present disclosure relates to a pressure indicator.

A conventional arrangement for indicating pressure is shown in FIG. 1. This shows a pressure indicator 10 which comprises a first reservoir 12 which defines a first enclosed volume 14 (or "pressure tapping") having a first inlet pipe 16 defining a first path length "L". The first inlet pipe 16 provides flow communication between the first enclosed volume 14 and a first source of pressurised fluid 20. A second reservoir 22 which defines second enclosed volume 24 (or "pressure tapping") having a second inlet pipe 26 that provides flow communication between the second enclosed volume 24 and a second source of pressurised fluid 30 may also be provided, as shown in FIG. 1. A pressure transducer 32 is disposed between the first enclosed volume 14 and the second enclosed volume 24, being in communication with both. The first and/or second source of pressurised fluid 20,30 may be flowing or static, where the pressure of the fluid rises and falls. The pressure transducer 32 reacts to the pressure changes in the enclosed volumes. In the case where only a single inlet pipe and enclosed volume are present, the pressure transducer may be used to indicate changes in pressure. Where a first and second inlet pipe and enclosed volume are present, as shown in FIG. 1, the pressure transducer maybe used to indicate differences in pressure between the first and second source of pressurised fluid 20,30.

A problem with this design is that the system may exhibit Helmholtz resonance. The Helmholtz resonance may occur at a frequency which is given approximately by:

$$f = \frac{v}{2\pi}\sqrt{\frac{A}{V_0 L}}$$

Where v is the speed of sound in the fluid, A and L are the cross-sectional area and length of the inlet pipe respectively, and $V_0$ is the volume of the reservoir (i.e. the enclosed volume).

Helmholtz resonance occurs when a pressurised compressible fluid within an enclosed volume (or "cavity") equalizes pressure with respect to a reduced external pressure, i.e. the source of pressurised fluid 20,30. The fluid within the enclosed volume expands driving the fluid in the inlet pipe out. Due to the inertia of the fluid in the inlet pipe, the pressure in the enclosed volume drops below the external pressure causing fluid to be sucked back into the enclosed volume again to create a rise in pressure above that of the external pressure. This will repeat with a decay until the pressure in the enclosed volume equalises with the source of pressurised fluid.

In instances where the external pressure varies at a frequency which is matched to a resonant frequency of the enclosed volume, the resonance will draw energy from the pressure source, and the amplitude of the pressure fluctuations within the enclosed volume will grow until they greatly exceed the amplitude of the pressure fluctuations in the pressure source, and may be sufficient to damage the pressure transducer and/or the structure which defines the inlet pipes and enclosed volumes.

One way to avoid resonance is to choose dimensions of the enclosed volumes such that the resonant frequencies of the cavities do not coincide with multiples of the external pulsing frequencies present in the source of pressurised fluid. However, it may not be possible to achieve this over the entire operational range of the equipment which the pressure indicator is attached to. Alternatively, an error in design may mean that resonance occurs in an unexpected operational range, the only solution of which may be to redesign the enclosed volumes. This may not be possible within the available space, and even if it is, it will incur time and cost penalties.

Hence a pressure indicator for indicating pressure of a pressure source which is operational over a wide range of operating conditions and exhibits low amplitude Helmholtz resonance at a resonant frequency below the operational range of the pressure indicator is highly desirable.

SUMMARY

Accordingly there is provided a pressure indicator for indicating pressure of a pressure source, the indicator comprising a first reservoir which defines a first enclosed volume having a first inlet pipe for communication between the first enclosed volume and a first source of pressurised fluid, and a damping passage is provided in fluid communication with the first enclosed volume, wherein a pressure oscillation damping means is provided in the damping passage.

The introduction of a pressure oscillation damping means will reduce the amplitude of any Helmholtz resonance generated within the enclosed volume. It thereby protects any equipment attached to the cavity.

The damping means may comprise a moveable body constrained within a limited range of motion along the damping passage. The body may be moveably mounted within the damping passage such that it is free to reciprocate longitudinally along at least part of the length of the damping passage. The body may be spherical the body may be biased towards one end of the damping passage by a resilient member.

The damping means may provide a seal in the damping passage such that there is no fluid flow around the damping means.

The pressure indicator may further comprise a second reservoir which defines a second enclosed volume having a second inlet pipe for communication between the second enclosed volume and a second pressure source, wherein the first enclosed volume and second enclosed volume are in flow communication with the damping passage.

There may be provided a flow path for the fluid around the damping means.

The damping passage may provide fluid communication between the first enclosed volume and the first source of pressurised fluid.

The pressure indicator may further comprise a second reservoir which defines a second enclosed volume having a second inlet pipe for communication between the second enclosed volume and a second pressure source, wherein the first enclosed volume and second enclosed volume are in flow communication with one another via the damping passage.

The damping passage may be in communication with a source of pressurised fluid in addition to the first source of pressurised fluid.

The damping passage may be located within the first inlet pipe. The damping passage may be concentric with the first inlet pipe, or offset with respect to the first inlet pipe. There may be provided a flow path for the fluid around the damping passage.

The pressure indicator may further comprise a pressure transducer in communication with the first enclosed volume. A pressure transducer may be provided in communication with the first enclosed volume and the second enclosed volume.

BRIEF DESCRIPTION OF THE DRAWINGS

Examples of the present disclosure will now be described with reference to the accompanying drawings, in which.

DETAILED DESCRIPTION

Figures 2, 3A, 3B:
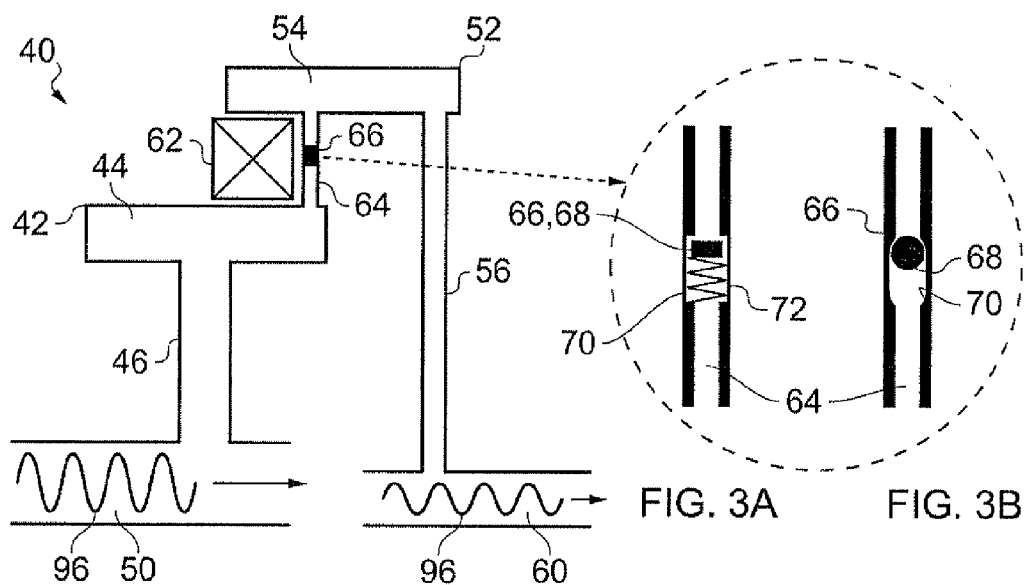
FIG. 2 shows a first example of a pressure indicator according to the present disclosure.
FIGS. 3a and 3b show a region of FIG. 2 in more detail.

FIG. 2 shows a first example of a pressure indicator 40 of the present disclosure. The pressure indicator 40 comprises a first reservoir 42 which defines a first enclosed volume 44 (or "pressure tapping") having a first inlet pipe 46. The first inlet pipe 46 provides flow communication between the first enclosed volume 44 and a first source of pressurised fluid 50. The pressure indicator 40 also has a second reservoir 52 which defines a second enclosed volume 54 having a second inlet pipe 56 for communication between the second enclosed volume 54 and a second source of pressurised fluid 60. A differential pressure transducer 62 is provided between and in communication with the first and second enclosed volumes 44,54, for the indication of differences in pressure between the first source of pressurised fluid 50 and the second source of pressurised fluid 60. The pressure transducer 62 may be placed in communication with the enclosed volumes 44, 54, either through an orifice in the wall of the reservoirs 42,52 or by abutment with the wall of the reservoirs 42,52. A damping passage 64 is provided in fluid communication with the first enclosed volume 44 and the second enclosed volume 54. A pressure oscillation damping means 66 is provided in the damping passage 64. The damping means 66 comprises a moveable body 68 constrained within a limited range of motion along the damping passage 64. FIG. 3a and FIG. 3b show example configurations of the moveable body 68. The body 68 is moveably mounted within the damping passage 64 such that it is free to reciprocate longitudinally along at least part of the length of the damping passage 64. In the examples shown the body 68 is located in a chamber 70 defined by the damping passage 64. In FIG. 3a the body 68 is a cylindrical piston. In FIG. 3b the body 68 is spherical. The body 68 may be biased towards one end of the damping passage 64 by a resilient member 72 as shown in FIG. 3a.

The damping passage 64 may provide fluid communication between the first enclosed volume 44 and the second enclosed volume 54, or may provide a seal between the first enclosed volume 44 and the second enclosed volume 54 such that there is no fluid flow around the damping means 66.

Figure 4:
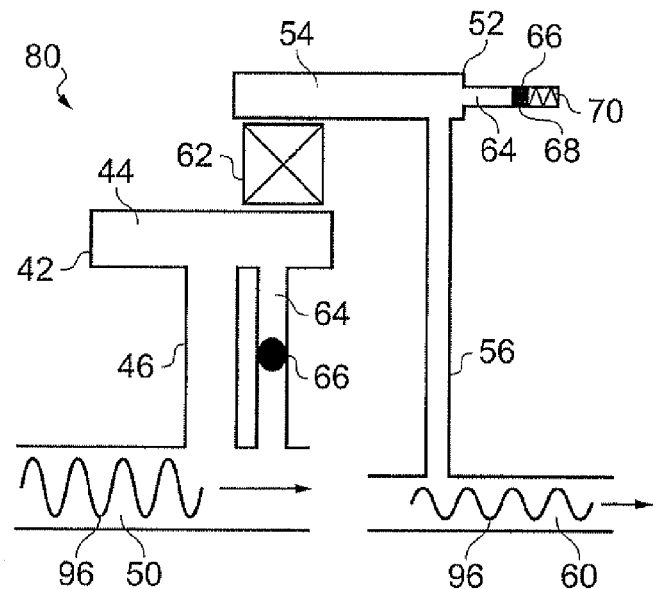
FIG. 4 shows a second example of a pressure indicator according to present disclosure.

FIG. 4 shows an alternative example of the present disclosure. In this example the pressure indicator 80 has many features in common with that of the FIG. 2 example, and common features are indicated with the same integer numbers. In this example two damping passages 64 and damping means 66 are provided. A first damping passage 64 is in fluid communication with the first enclosed volume 44 and the first source of pressurised fluid 50, the damping means 66 shown being similar to the damping means 66 presented in FIG. 3b, although it could be as that shown in FIG. 3a or any other appropriate form. The damping passage 64 may provide fluid communication between the first enclosed volume 44 and the first source of pressurised fluid 50, or may provide a seal between the first enclosed volume 44 and the first source of pressurised fluid 50. A second damping passage 64 is in fluid communication with only the second enclosed volume 54. A piston like body 68 is resiliently biased against the end of the damping passage 64 towards the second enclosed volume 54 by a resilient member 72, such as a spring.

Figure 5:
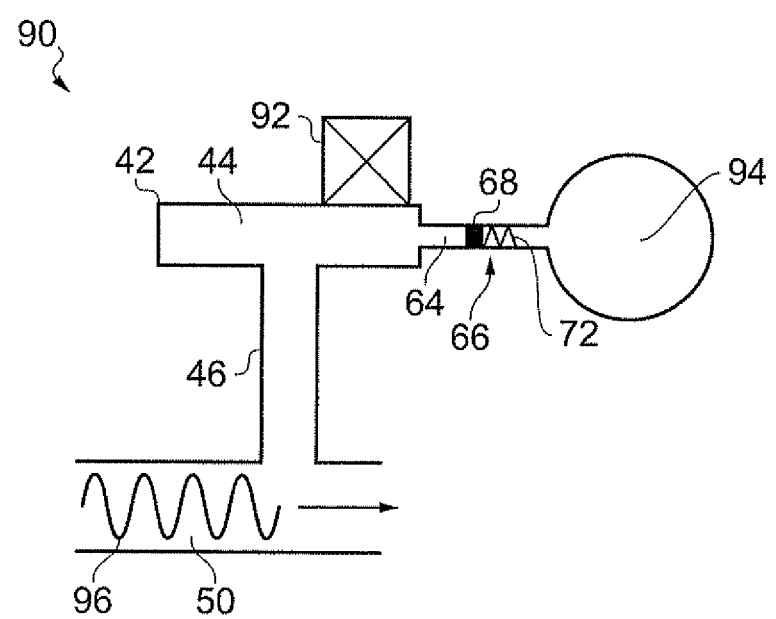
FIG. 5 shows a third example of a pressure indicator according to the present disclosure.

FIG. 5 shows another alternative example which has some features in common with that of the FIG. 2 example, and common features are indicated with the same integer numbers. In this example the pressure indicator 90 comprises a first reservoir 42 which defines a first enclosed volume 44 (or "pressure tapping") having a first inlet pipe 46. The first inlet pipe 46 provides flow communication between the first enclosed volume 44 and a first source of pressurised fluid 50. A pressure transducer 92 may be placed in communication with the enclosed volume 44, either through an orifice in the wall of the reservoir 42 or by abutment with the wall of the reservoir 42. The pressure transducer will thus be able to register variations in pressure 96 in the first source of pressurised fluid 50. A damping passage 64 is provided in fluid communication with the first enclosed volume 44 and in communication with third source of pressurised fluid 94, which is in addition (i.e. different) to the first source of pressurised fluid 50. A pressure oscillation damping means 66 is provided in the damping passage 64. In this example the damping means 66 is as shown in FIG. 3a, although could be as that shown in FIG. 3b or any other appropriate form. The damping passage 64 may provide fluid communication between the first enclosed volume 44 and the third source of pressurised fluid 94, or may provide a seal between the first enclosed volume 44 and the third source of pressurised fluid 94.

Figure 6:
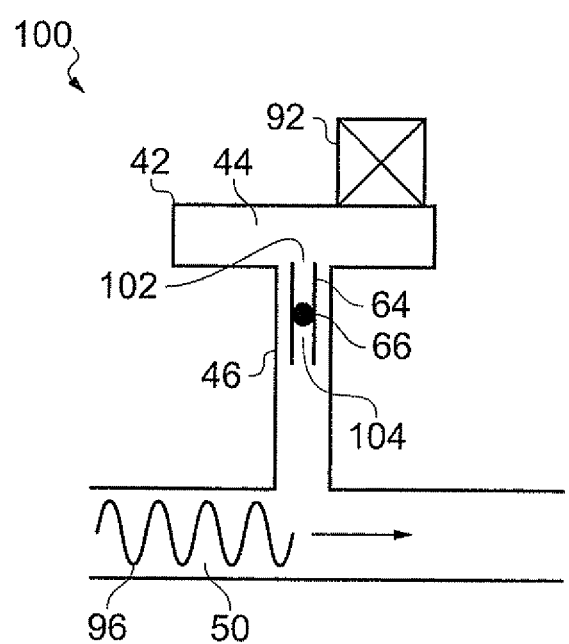
FIG. 6 shows a fourth example of a pressure indicator according to the present disclosure.

FIG. 6 shows another alternative example which has some features in common with that of the FIG. 2 example, and common features are indicated with the same integer numbers. In this example the pressure indicator 100 comprises a first reservoir 42 which defines a first enclosed volume 44 (or "pressure tapping") having a first inlet pipe 46. The first inlet pipe 46 provides flow communication between the first enclosed volume 44 and a first source of pressurised fluid 50. A pressure transducer 92 may be placed in communication with the enclosed volume 44, either through an orifice in the wall of the reservoir 42 or by abutment with the wall of the reservoir 42. The pressure transducer will thus be able to register variations in pressure 96 in the source of pressurised fluid 50. A damping passage 64 is provided within the first inlet passage 46, either concentrically or offset relative to the first inlet passage 46. The damping passage 64 may or may not extend the entire length of the inlet passage 46, and will have a first aperture 102 at one end towards the enclosed volume 44, and a second aperture 104 at the other end towards the pressure source 50. The damping passage 64 may be located with its first aperture 102 adjacent the enclosed volume 44, as shown in FIG. 6. Alternatively, or additionally, the damping passage 64 may be located with the second aperture 104 adjacent the pressure source 50. Alternatively both apertures 102,104 of the damping member 46 may be located spaced apart from both the enclosed volume 44 and pressure source 50. A pressure oscillation damping means 66 is provided in the damping passage 64. In this example the damping means 66 is as shown in FIG. 3b, although could be as that shown in FIG. 3a or any other appropriate form. A flow path between the first enclosed volume 44 and the source of pressurised fluid 50 is provided around the damping passage 66 and an additional fluid communication path may be provided through the damping passage 64.

The first and/or second source of pressurised fluid 50,60 may be flowing or static, where the pressure of the fluid rises and falls.

In examples in which there is provided a flow path for the fluid around the damping means 66, and where in operation of a device of the present disclosure, the source of pressurised fluid 50,60 is flowing, the flow rate through the passage 64, and thus the flow induced in the inlet pipe 46,56, may be substantially less than the flow rate of the source of pressurised fluid 50,60.

In examples in which there is provided a flow path for the fluid around the damping means 66, and where in operation of a device of the present disclosure, the source of pressurised fluid 50,60 is static, the cross-sectional area of the passage 64 may be substantially less than that of the source of pressurised fluid 50,60 such that the flow induced in the passage has negligible effect on the source 50, 60.

In operation, any pressure oscillations 96 present in the pressure indicator system will cause the moveable body 68 to move along the damping passage 64. Hence at least part of energy of the oscillations is damped. Additionally, the slight change in volume which occurs when the moveable body 68 is moved along the damping passage 64 also creates a pressure oscillation damping effect. Damping will also occur as a result of leakage past the damping means 66 as a result of the flow path provided around the moveable body 68.

The damping effect will depend on the placement of the damper relative to the enclosed volume 44,54. Maximum effect achieved when the damper is in direct flow communication with the enclosed volume 44,44 as the effective volume change provided by the oscillation of the damping means in such a configuration will translate directly into the same change in volume of the enclosed volume 44,54.

The movement of the body 68 due to pressure fluctuations will dissipate energy through frictional and viscous effects. The change in volume due to the motion of the body 68 will alter the natural frequency of the pressure indicator subtly and move the pressure indicator system away from resonance. Any leakage flow along the passage 64 will increase system damping and alter the natural frequency due to the induced flow in the system. Thus the arrangement of the present disclosure provides effective damping of the system, and Helmholtz resonance is unlikely to occur.

Examples incorporating a damping means including no resiliently biased body 68 (i.e. that shown in FIG. 3b) will only move when the differential pressure across it reverses direction. Examples incorporating a resiliently biased body 68 (i.e. that shown in FIG. 3a) provide the advantage that oscillations will be damped regardless of pressure drop across the damping means provided the resilient member has not been stressed to the limit of its motion.

Thus the arrangement of the present disclosure provides effective damping of the pressure indicator system, and damaging amplitudes of Helmholtz resonance is unlikely to occur. A pressure indicator according to the present disclosure, plus any equipment attached to it, will thus be less susceptible to damage due to Helmholtz resonance. This provides pressure indicating equipment with higher survivability than conventional systems, and which are easier to configure for a wider range of applications.

Figure 1:
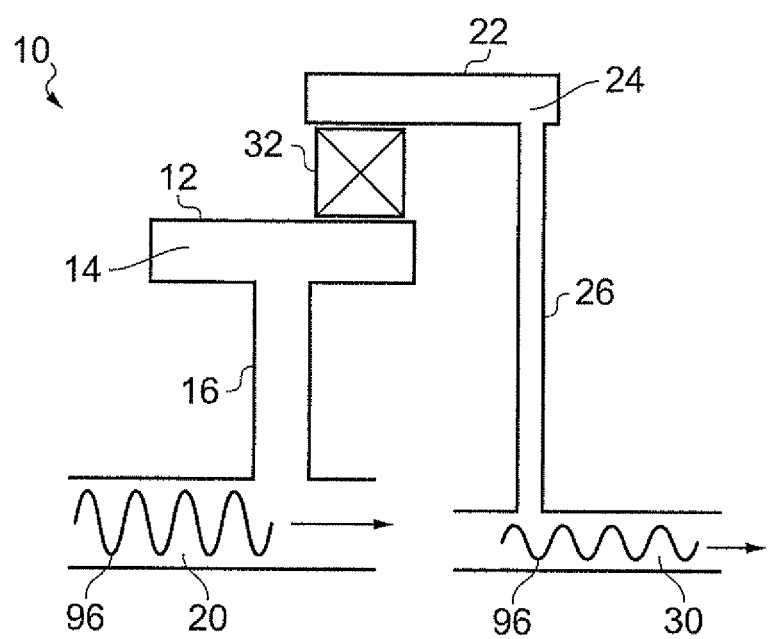
FIG. 1 shows a pressure indicator.

Devices according to the present disclosure may also be easily retrofitted to a system according to FIG. 1 by insertion of a passage 64 and damping means 66 into an existing system.

The invention claimed is:

1. A pressure indicator for indicating pressure of a pressure source, the indicator comprising:
   a first reservoir which defines a first enclosed volume having a first inlet pipe for communication between the first enclosed volume and a first source of pressurised fluid, and
   a damping passage is provided in fluid communication with the first enclosed volume, wherein
   a pressure oscillation damper is provided in the damping passage, the damper providing a seal in the damping passage such that there is no fluid flow around the damper, and the damper including a moveable body constrained within a limited range of motion along the damping passage.

2. The pressure indicator as claimed in claim 1, wherein the body is moveably mounted within the damping passage such that the body is free to reciprocate longitudinally along at least part of the length of the damping passage.

3. The pressure indicator as claimed in claim 2, wherein the body is spherical.

4. The pressure indicator as claimed in claim 2, wherein the body is biased towards one end of the damping passage by a resilient member.

5. The pressure indicator as claimed in claim 1, further comprising:
   a second reservoir which defines a second enclosed volume having a second inlet pipe for communication between the second enclosed volume and a second pressure source, wherein
   the first enclosed volume and second enclosed volume are in flow communication with the damping passage.

6. The pressure indicator as claimed in claim 1, wherein the damping passage is in communication with a source of pressurised fluid in addition to the first source of pressurised fluid.

7. The pressure indicator as claimed in claim 1, wherein the damping passage is located within the first inlet pipe.

8. The pressure indicator as claimed in claim 7, wherein the damping passage is concentric with the first inlet pipe.

9. The pressure indicator as claimed in claim 7, wherein the damping passage is offset with respect to the first inlet pipe.

10. The pressure indicator as claimed in claim 7, wherein there is provided a flow path for the fluid around the damping passage.

11. The pressure indicator as claimed in claim 1, further comprising:
    a pressure transducer in communication with the first enclosed volume.

12. The pressure indicator as claimed in claim 5, wherein a pressure transducer is provided in communication with the first enclosed volume and the second enclosed volume.

13. A pressure indicator for indicating pressure of a first source of pressurised fluid, the indicator comprising:
    a first reservoir defining a first enclosed volume including:
       a first inlet pipe for fluid communication between the first enclosed volume and the first source of pressurised fluid;
    a damping passage that is in fluid communication with the first enclosed volume of the first reservoir; and
    a pressure oscillation damper disposed in the damping passage, the pressure oscillation damper including a moveable body constrained within a limited range of motion along the damping passage, and the pressure oscillation damper being configured to form a seal in the damping passage such that fluid does not flow past the damper.

14. The pressure indicator as claimed in claim 13, wherein the moveable body is moveably mounted within the damping passage such that the moveable body is free to reciprocate longitudinally along at least part of the length of the damping passage.

15. The pressure indicator as claimed in claim 14, wherein the body is spherical.

16. The pressure indicator as claimed in claim 14, wherein the body is biased towards one end of the damping passage by a resilient member.

17. A pressure indicator for indicating pressure of a first source of pressurised fluid and a second source of pressurised fluid, the indicator comprising:
   a first reservoir defining a first enclosed volume including: a first inlet pipe for fluid communication between the first enclosed volume and the first source of pressurised fluid;
   a second reservoir defining a second enclosed volume including: a second inlet pipe for fluid communication between the second enclosed volume and the second source of pressurised fluid;
   a damping passage that is in fluid communication with the first enclosed volume of the first reservoir and the second enclosed volume of the second reservoir; and
   a pressure oscillation damper disposed in the damping passage, the pressure oscillation damper including a moveable body constrained within a limited range of motion along the damping passage, and the pressure oscillation damper being configured to form a seal in the damping passage such that fluid does not flow past the damper.

18. The pressure indicator as claimed in claim 17, wherein the moveable body is moveably mounted within the damping passage such that the moveable body is free to reciprocate longitudinally along at least part of the length of the damping passage.

19. The pressure indicator as claimed in claim 18, wherein the body is spherical.

20. The pressure indicator as claimed in claim 18, wherein the body is biased towards one end of the damping passage by a resilient member.

* * * * *